United States Patent [19]
Yoshimi et al.

[11] Patent Number: 4,721,642
[45] Date of Patent: Jan. 26, 1988

[54] ARTICLE HAVING ADHERED, VELVETY POLYURETHANE RESIN FOAM-COATED PILE AS A SURFACE DECORATION

[75] Inventors: Takaharu Yoshimi; Shoji Sakaida, both of Aichi; Yasuyuki Mitsutome, Nagoya, all of Japan

[73] Assignee: Toyoda Gosei Co., Ltd., Nishikasugai, Japan

[21] Appl. No.: 927,234

[22] Filed: Nov. 5, 1986

[30] Foreign Application Priority Data

Nov. 30, 1985 [JP] Japan ................... 60-270420

[51] Int. Cl.$^4$ ............................................ B32B 33/00
[52] U.S. Cl. ........................................ 428/90; 428/86; 428/92; 428/95; 428/96; 428/317.9; 428/319.9
[58] Field of Search ............... 428/86, 90, 92, 95, 428/96, 317.9, 319.9

[56] References Cited

U.S. PATENT DOCUMENTS 4,455,338  6/1984  Henne .......................... 428/137

Primary Examiner—Marion C. McCamish
Attorney, Agent, or Firm—Cushman, Darby & Cushman

[57] ABSTRACT

The present invention relates to a mold finished with decoration being soft to touch presenting velvety touch and lustrious appearance. Formed on the surface of a base portion is a soft intermediated layer for imparting a soft warm feel thereto. A multitude of piles are bonded thereto through an adhesive layer for imparting a soft feel to the soft intermediate layer, and a surface coating layer of polyurethane resin having fine foams therein is coated thereon. The mold of the present invention constructed as mentioned above presents velvety touch and lustrious appearance.

12 Claims, 8 Drawing Figures

ARTICLE HAVING ADHERED, VELVETY POLYURETHANE RESIN FOAM-COATED PILE AS A SURFACE DECORATION

BACKGROUND OF THE INVENTION

1. Field of the Invention

The present invention relates to an article having decorated finishing on its surface, which article may be utilized for interior trim of an automobile, and decoration of and ornaments in a house.

2. Description of the Related Art

In the interior of an automobile, parts such as instrument panels, armrests, and pillar trim panels, are finished in various ways for the purpose of decoration and protection. For example, the base portions of such items are coated with a bead-containing paint, or are covered with flocked pile, or a skin of suede-like synthetic leather. The interior of a house is also decorated in a similar manner for the same purpose.

Articles decorated by above mentioned methods have some disadvantages. The coated one feels hard, and inexpensive; the pile covered one feels soft, but lacks a smooth velvety touch; and the leather-skinned one has velvety touch, but is expensive.

SUMMARY OF THE INVENTION

It is an object of the present invention to provide an article finished with decoration which is soft to touch, feels smooth, and yet is not expensive.

It is another object of the present invention to provide an article finished with decoration which is soft to touch and which makes the interior of an automobile look elegant on account of a suede-like appearance and smooth touch.

It is still another object of the present invention to provide an article finished with decoration which is soft to touch which has good durability.

The decorated article of this invention is composed of a base portion and a coating layer formed thereon, said coating layer being made of a polyurethane resin cellular paint having fine bubbles therein and producing a velvety touch.

Other and further objects of this invention will become obvious upon an understanding of the illustrative embodiments about to be described or will be indicated in the appended claims, and various advantages not referred to herein will occur to one skilled in the art upon employment of the invention in practice.

BRIEF DESCRIPTION OF THE DRAWINGS

By way of example and to make the description more clear, reference is made to the accompanying drawings in which.

DESCRIPTION OF THE PREFERRED EMBODIMENTS

Example 1

Figure 1:
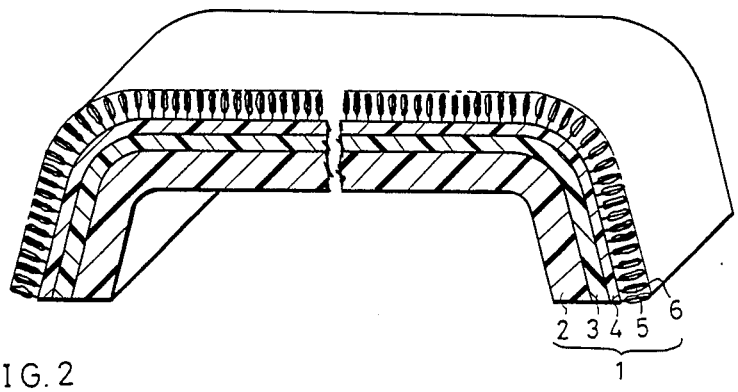
FIG. 1 is a fragmentary perspective view of a first embodiment of a decorated article of the present invention.
Figure 2:
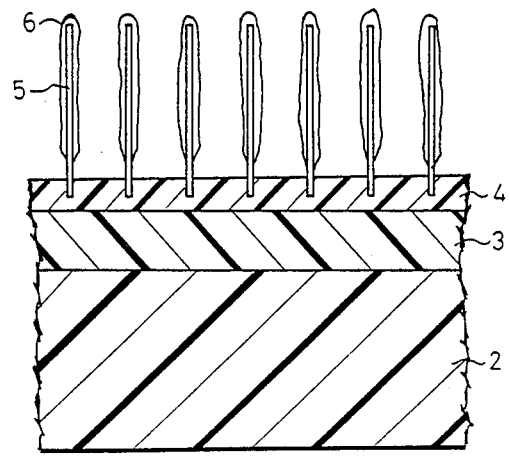
FIG. 2 is a enlarged fragmentary cross-sectional view of the first embodiment.
Figure 3:
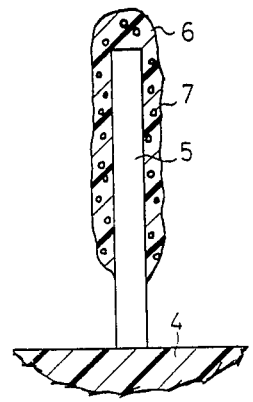
FIG. 3 is a further enlarged fragmentary cross-sectional view of the first embodiment of the decorated article, showing layer of polyurethane resin cellular paint on an isolated length of the pile.

In this example, the invention is embodied in an automotive instrument panel 1 shown in FIGS. 1 to 3. A base portion 2 of the instrument panel 1 is an injection-molded product of polypropylene resin having a substantially U-shaped cross-section. A soft intermediate layer 3 of soft polyvinyl chloride resin is coated on the upper surface and both the lateral outside surfaces of the base portion 2. An adhesive layer 4 of polyurethane adhesive is formed on the surface of the soft intermediate layer 3, and a plurality of lengths of pile 5 made of colored polyamide fiber of 0.4 mm long and of 1 denier are shown each having one end secured by the adhesive layer to the base portion 2. A surface coating layer 6 of polyurethane resin cellular paint covers all or part of the pile 5. (The surface coating layer 6 will be simply referred as the coating layer.)

The polyurethane resin cellular paint is composed of blocked polyisocyanate prepolymer as the major constituent and additives (mentioned later). The prepolymer is composed of a blocked polyisocyanate and a polyol such as polyester polyol.

The blocked polyisocyanate is a polyisocyanate which is inert at normal temperature. It is obtained by blocking the terminal —NCO group of polyisocyanate (such as hexamethylene diisocyanate, xylylene diisocyanate, and diphenylmethane-4,4′-diisocyanate) with a blocking agent (such as alcohol, e.g., butanol), phenols, ethyl acetoacetate, ε-caprolactam, MEK oxime, dietyl malonate, acetoacetone, cyanic acid, and sodium bisulfite).

The blocked polyisocyanate prepolymer should preferably be used in the form of aqueous dispersion. The ratio of water to blocked polyisocyanate prepolymer should be about 1:1 by weight.

The polyester polyol as a constituent of the block polyisocyanate is a reaction product of a saturated or unsaturated aliphatic polyester and a polyol in an excess amount. It should be of low-molecular weight type having a number-average molecular weight of 300 to 7000, preferably 700 to 5000.

As shown in FIG. 3, the coating layer (6) has fine bubbles 7 formed therein by a foaming agent. The foamed plastic resin imparts a velvety touch to the pile 5 so that it feels soft to the touch.

The coating layer 6 contains a variety of additives such as dye or pigment for decoration, antisagging agent, levelling agent, and filler to produce the velvety touch.

The dye or pigment (preferable) should be one which has the same color tone as the pile 5. It is used in an amount of 10 to 50 parts by weight for 100 parts by weight of polyurethane resin. The filler is polystyrene beads having an average particle diameter of 6 to 200

μm. It is used in an amount of 1 to 20 parts by weight for 100 parts by weight of polyurethane resin.

The instrument panel 1 is produced in the following manner. At first, a laminated product composed of the base portion 2 and the soft intermediate layer 3 is produced by in-mold injection molding. Then, a polyurethane adhesive is applied to the soft intermediate layer 3, whereby the adhesive layer 4 is formed. The pile 5 having the length and denier as specified above is applied to the adhesive layer 4 so that the pile 5 is bonded to the adhesive layer 4. Excess unbonded pile is removed. Finally, the polyurethane resin foamable paint is applied by spraying onto the pile 5. This paint is an aqueous dispersion composed of blocked polyisocyanate prepolymer, additives, chain extender, foaming agent, and emulsifier.

The chain extender is usually a cationic surface active agent obtained by reacting a higher fatty acid such as stearic acid and behenic acid with an amine compound such as aminoethylethanolamine, diethyltriamine, and polyethylenepolyamine. An anionic surface active agent or nonionic surface active agent can also be used.

The foaming agent is a chemical foaming agent that evolves nitrogen gas or carbon dioxide gas upon thermal decomposition. It may also be in the form of microcapsules containing such a gas as above. The foaming agent is added in an amount of 3 to 15 wt% to the polyurethane paint.

The polyurethane resin foamable paint applied to the pile 5 undergoes a preliminary drying step, during which water in the paint is evaporated, whereby the coating layer 6 is formed on the pile 5. The preliminary drying step is performed at a temperature high enough for moisture in the paint to evaporate but low enough for the foaming agent to remain non-decomposed.

After the preliminary drying, the surface of the flocked article is heated at about 130 C. by a far-infrared heater or hot-air dryer for 4 to 40 seconds. This heating releases the ethyl acetoacetate from the blocked polyisocyanate prepolymer and causes the prepolymer to react with the chain extender. Along with this reaction, the foaming agent in the coating layer 6 expands to form the fine bubbles of foam 7 in the coating layer 6.

The foamed coating layer 6 is subjected to brushing so that the pile fibers 5, which are joined together by the coating layer 6, are separated into one to several discrete pieces.

Thus there is obtained a article coated with decoration 1, as shown in FIGS. 1 to 3, which has discrete pieces of pile 5 on the soft intermediate layer 3.

The instrument panel 1 obtained in this example has a suede-like elegant appearance and feel on account of the synergistic effect of the soft feeling of the pile 5 and the velvety touch of the paint layer 6. Furthermore the soft intermediate layer 3 gives a soft touch to the hand when pressed against the instrument panel 1 through the pile 5. Thus the instrument panel 1 sets off the interior of an automobile owing to its elegant appearance and soft touch.

Example 2

Figure 4:
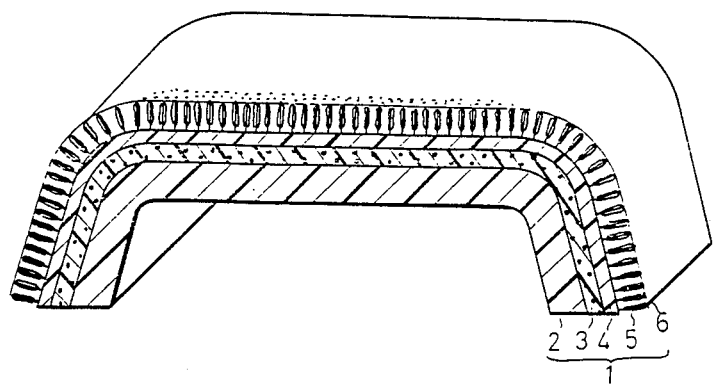
FIG. 4 is a fragmentary perspective view of a second embodiment of the decorated article of the present invention.

In this example, the invention is embodied in an automotive pillar trim panel shown FIG. 4. The pillar garnish 1 includes a base portion which is an injection-molded product of polypropylene resin having a U-shaped cross section. A soft intermediate layer 3 of polyurethane resin foam is coated on the upper surface and both the lateral outerside surfaces and an adhesive layer 4 of polyurethane adhesive is formed on the surface thereon. A plurality of lengths of pile 5 of polyamide fiber of 1.4 mm long and of 3 denier have their one ends adhered to the adhesive layer 4 and a foamed surface coating layer 6 is provided on the piles 5. The piles 5 have the same velvety touch as in Example 1.

The soft intermediate layer 3 in the pillar trim panel 1 in this example also produces the same effect as in Example 1. In addition, the soft intermediate layer 3 of foamed material makes the pillar trim panel 1 be rather soft as a whole than the first example.

Example 3

Figure 5:
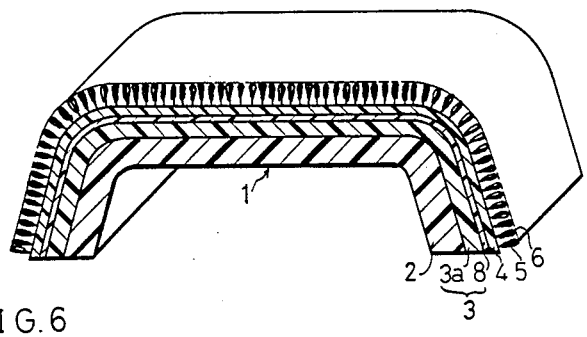
FIG. 5 is a fragmentary perspective view of a third embodiment of the decorated article of the present invention.

In this example, the invention is embodied in an automotive console lid as shown in FIG. 5. The base portion thereof 2 is an injection-molded product molded of ABS resin and having substantially a U-shaped cross-section. Formed on the upper surface and both the lateral outside surfaces of the base portion 2 is a soft intermediate layer 3 composed of polyvinyl chloride resin foam 3a and polyvinyl chloride resin skin layer 8 coated thereon. An adhesive layer 4 of polyurethane adhesive is formed on the surface of the skin layer 8 and a plurality of lengths of pile 5 made of polyamide fiber of 0.7 mm long and of 5 denier have their one ends adhered to the adhesive layer 4. A foamed surface coating layer 6 to impart the velvety touch to the pile 5 is attached on the surface thereof.

The soft intermediate layer 3 in the console lid 1 in this example is composed of a foam 3a and a skin layer 8, so that the foam 3a to produce the softness is protected by the thin skin layer 8. Therefore, the console lid 1 in this example has the same soft touch as in Example 2 and produces more elegant touch and durability than the pillar garnish in Example 2.

Example 4

Figure 6:
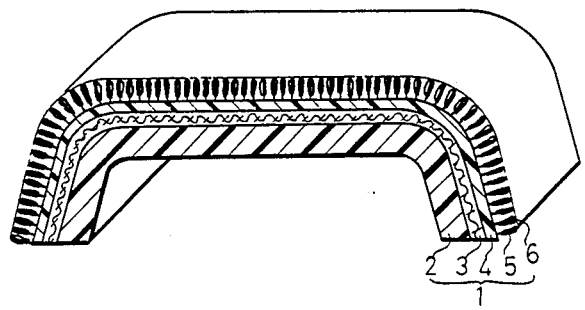
FIG. 6 is a fragmentary perspective view of a fourth embodiment of the decorated article of the present invention.

In this example, the invention is embodied in an automotive instrument panel core as shown in FIG. 6. A base portion 2 is an injection-molded product of polypropylene resin having substantially a U-shaped cross-section. Formed on the upper surface and both the lateral outside surfaces of the base portion 2 is a soft intermediate layer 3 of polypropylene non-woven fabric, and adhesive layer 4 of polyurethane adhesive is formed thereon. A plurality of lengths of pile 5 of colored polyamide fiber of 0.5 mm long and of 1 denier have their one ends adhered to the adhesive layer, and a foamed surface coating layer 6 to cover all or part of the piles 5 is provided thereon. The base portion provided with the non-woven fabric is produced by a well-known method, e.g. by in-mold injection molding of polypropylene resin, with the polypropylene non-woven fabric previously set in the mold cavity.

The coating layer 6 formed on the pile 5 produces the velvety touch as in the case of Example 1, and the soft intermediate layer 3 imparts the soft touch to the instrument panel core 1.

Example 5

Figure 7:
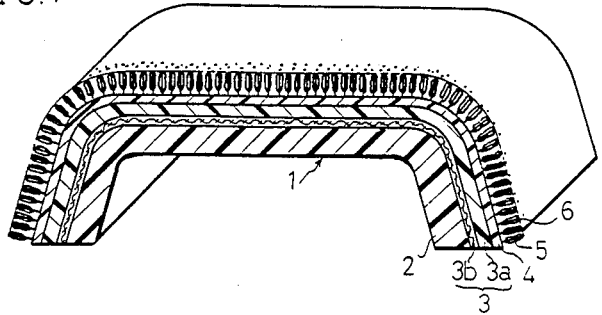
FIG. 7 is a fragmentary perspective view of a fifth embodiment of the present invention.

In this example, the invention is embodied in an automotive pillar trim panel as shown in FIG. 7, in a manner different from that in the pillar trim panel in Example 2. The base portion 2 is an injection-molded product made of polypropylene resin having a substantially U-shaped cross-section. Formed on the upper surface and both of the lateral outside surfaces of the base portion 2 is a laminated soft intermediate layer 3 composed of a woven cloth of polyester fiber 3b and a foam of polyvinyl chloride resin 3a, and an adhesive layer 4 of polyurethane adhesive is coated thereon. A plurality of lengths of pile 5 of polyamide fiber of 0.4 mm long and of 1 denier have their one ends adhered to the adhesive layer 4, and a foamed surface coating layer 6 is provided thereon. The laminated intermediate layer 3 is produced in anticipation by another step. The base portion 2 provided with the soft intermediate layer 3 is produced by in-mold injection molding of polypropylene resin, with the laminate previously set in the mold cavity.

The soft intermediate layer 3 in the pillar trim panel 1 in this example also produces the same effect as in Example 1. The pillar trim panel 1 in this example is softer than that in Example 2 because the intermediate layer 3 is composed of a foam 3a and a woven fabric 3b.

Example 6

Figure 8:
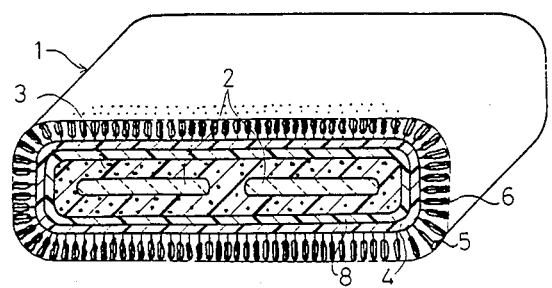
FIG. 8 is a fragmentary perspective view of a sixth embodiment of the present invention.

In this example, the invention is embodied in an automotive sun visor as shown in FIG. 8. The sun visor 1 is composed of a plate member having two base portions 2 and a soft intermediate layer of polyurethane resin foam formed thereon. The base portions 2 are composed of two hard boards or metal plates arranged on the same plane. The outer surface of the plate member is covered with a skin layer 8 of polyvinyl chloride resin having an adhesive layer 4 coated thereon. A plurality of lengths of pile 5 have their one ends adhered to the adhesive layer 4, and a foamed surface coating layer 6 is provided thereon. This sun visor 1 produces a velvety touch and soft warm feel on account of the lengths of pile 5 and the coating layer 6 formed thereon.

The scope of this invention is not limited to the above-mentioned examples. Other possible embodiments are given below.

(1) This method is applied to any article which requires decoration on its surface for giving a suede-like lustrious appearance on its surface to enhance the impression of quality. Most preferable products to utilize this coating method are: a steering wheel (ring and pad), glove compartment door, armrest, skylight trim, ceiling, etc. of the upholstery of an automobile.

(2) Metal or wood is available instead of synthetic resin for base portion 2.

(3) Those items in which the soft intermediate layer 3 is a foam of polypropylene resin or polyethylene resin.

(4) Other adhesives like polyester resin adhesive are available than polyurethane resin adhesive.

(5) Fiber capable of being flocked such as wool fiber is available to constitute the pile 5. The pile may have a fineness of 0.1 to 7 denier and a length of 0.1 to 1.2 mm.

(6) Those items in which the coating layer on the pile 5 is formed by brush coating or other means.

(7) The amount of the foaming agent ranges from 3 to 40 parts by weight based on 100 parts by weight (solids) of polyurethane resin, depending on the content of foams 7 required and the blowing efficiency.

As many apparently widely different embodiments of this invention may be made without departing from the spirit and scope thereof, it is to be understood that the invention is not limited to the specific embodiments thereof.

What is claimed is:

1. A velvety-surfaced article, comprising:
a base having a surface;
a layer of adhesive provided on said surface;
a plurality of lengths of pile having opposite ends, said lengths of pile being attached to said surface by having one ends of said lengths of pile adhered to said layer of adhesive to provide a pile on said surface; and
said lengths of pile, externally of said layer of adhesive, being coated with foamed polyurethane resin, at least some of said coated lengths of pile being separate from one another externally of said layer of adhesive so as to provide a velvety touch.

2. The velvety-surfaced article of claim 1, further including:
an intermediate layer of soft synthetic plastic material interposed between said surface of said base and said layer of adhesive.

3. The velvety-surfaced article of claim 2, wherein:
said soft intermediate layer is made of polyvinyl chloride resin.

4. The velvety-surfaced article of claim 2, wherein:
said soft intermediate layer is made of polyurethane resin foam.

5. The velvety-surfaced article of claim 2, wherein:
said soft intermediate layer is made of polypropylene non-woven fabric.

6. The velvety-surfaced article of claim 2, wherein:
said soft intermediate layer is made of a laminate composed of a lamina of polyvinyl chloride resin attached to a lamina of polyester fiber fabric.

7. The velvety-surfaced article of claim 2, wherein:
said soft intermediate layer is constituted by a foamed resin made of one constituent selected from the group consisting of polypropylene and polyethylene.

8. The velvety-surfaced article of claim 1, wherein:
said coating further includes:
an antisagging agent to maintain said polyurethane in film form,
a levelling agent for maintaining said coating in a smooth-surfaced state,
a filler;
a chain-extender;
a foaming agent; and
an emulsifier.

9. The velvety-surfaced article of claim 1, wherein:
said coating is composed of a blocked polyisocyanate prepolymer containing a colored dye or pigment.

10. The velvety-surfaced article of claim 9, wherein:
said blocked polyisocyanate prepolymer is composed of blocked polyisocyanate and polyol.

11. The velvety-surfaced article of claim 10, wherein:
said blocked polyisocyanate is one selected from the group consisting of hexamethylene diisocyanate, xylylene diisocyanate and diphenylmethane-4,4'-diisocyanate, and a blocking agent selected from the group consisting of butanol, phenol, ethyl acetoacetate, E-caprolactam, MEK oxime, diethyl malonate, acetoacetone, prussic acid and sodium bisulfite.

12. A velvety-surfaced article, comprising:
a base having a surface;
a plurality of lengths of pile having opposite ends, said lengths of pile being attached to said surface by having one ends of said lengths of pile attached to said surface by attaching means to provide a pile on said surface; and
said lengths of pile, externally of said attaching means being coated with foamed polyurethane resin, at least some of said coated lengths of pile being separate from one another externally of said attaching means so as to provide a velvety touch.

* * * * *